Figure 1:
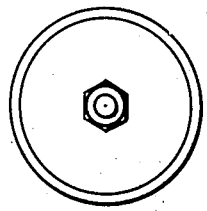

June 26, 1951     R. U. CLARK     2,558,172

HIGH-VOLTAGE ELECTROLYTIC CHARGE STORING CELL

Filed June 24, 1949

INVENTOR.
Richard U. Clark
BY
James R. Hodder
Attorney

Patented June 26, 1951

2,558,172

UNITED STATES PATENT OFFICE 2,558,172

HIGH-VOLTAGE ELECTROLYTIC CHARGE STORING CELL

Richard U. Clark, Belmont, Mass.

Application June 24, 1949, Serial No. 101,235

2 Claims. (Cl. 175—315)

The present invention has to do with electrolytic condensers or cells and especially such cells as are made with porous electrodes that are permeable to electrolyte.

More specifically this invention embodies a means for electrically anodizing and operating electrolytic cells or condensers at high voltages, and at the same time maintaining the electrical resistance, also known as the series resistance, of the condenser at a relatively low value. These desired characteristics are obtained to a far greater degree than would be possible by mere conventional changes in electrical characteristics of the electrolyte or of the nature of the dielectric film on the electrodes of the cell or condenser in-so-far as is now known or practiced in the art.

The present day limitation as to operating voltages is tied up with, or controlled by, the sparking voltage of the electrolyte used to make the individual electrolytic condenser operative. It is a well accepted fact that as the sparking voltage of the electrolyte increases in value and consequently the safe operating voltage of the condenser also increases, the efficiency of the condenser declines due to the rapid accompanying increase of electrolyte resistance.

It has been expedient in the past, as a result of the aforementioned limitations, to construct cells or condensers as individual units operated at some reasonable voltage at which for instance the series resistance remains quite low due to the use of a relatively high conductivity electrolyte. For use at high voltages such cells or condensers are currently connected in series when they are intended to be applied to uses involving voltages in excess of their individual ratings.

The use of cells or condensers in the manner just outlined involves the use of electrodes for both anode and cathode in each individual cell. As a result of such procedure in the building of series cells a two unit cell would require four electrodes, a four unit cell eight electrodes, and so on up each time it is desired to double the operating voltage of the unit assembly. This results in the use of excessive material in the form of extra cathode electrodes and also cell container material.

Another disadvantage of such a series of cells is that they often require the use of external resistive voltage dividers, in parallel with each unit of the condenser stack, to equalize the voltage across each cell. Such former series types of high voltage condensers are also for this reason very large and heavy.

It is an object of the present invention to provide a condenser which, altho acting in function as a series cell or condenser, does not embody the previously mentioned defects.

A further object is to provide a condenser in which there is an inherent voltage dividing action provided by the electrical resistance of a common electrolyte, by means of which the accurate division of voltage per cell remains quite constant by virtue of some interaction between sections of the electrolyte throughout the unit.

Still another feature of my invention is the ready provision of a condenser assembly which is in effect a series of more than one capacity, but in which each succeeding electrode in the series co-operates with each other electrode below it in potential as an anode, and also as a virtual cathode to any remaining electrode, above it in potential, in any series of electrodes immersed in a common electrolyte, which electrolyte however is sectionally divided by the electrodes themselves.

A further purpose of the present invention is to provide novel electrodes, as required by the invention, that are highly permeable to electrolytes but in which this permeability can be controlled over a wide range of values, also in which this choice of permeability can be maintained regardless of the type of metal that forms the conductive part of the electrode.

This novel feature of electrolyte permeability control can be effected in several ways. In the case of some electrodes in which I prefer a very high degree of porosity I prefer to form my electrode by depositing thin films of metal on a porous sponge of fritted glass, ceramic, or other relatively inert material, such, for example, as aluminum oxide, tantalum oxide or such inert metals. This metal deposition can be by means of evaporating, plating, or sputtering processes, or by the infiltration of very finely divided metal powders into the base pores coupled with subsequent sintering or melting to form a continuous conductive layer on the inert grains that make up the porous base.

As an example of base material various fritted glass disks, such for instance as the type well known in chemical laboratories as under the trade names of "Vycor" and "Pyrex," which can be readily controlled as to the degree of permeability to various electrolytes, and because of the high melting point of these or comparable ceramic filter disks, lend themselves to metal coating, and are readily available. Such structures in coated form are my preferred form of electrode for certain applications, whereas for other applications I may use other highly permeable electrodes as described in my Patents Numbers 2,283,723, 2,359,970, and 2,461,410.

In addition to the use of certain types of electrodes as described above, I have also developed a preferred method of applying a dielectric film to the metal parts of these electrodes whenever they are intended to be used as anodes or as anode and virtual cathode, as further described elsewhere in this application. This special mode of formation is carried out in various desired electrolytes by the application of suitable positive potentials on the anode members, associated with suitable cathodes while in contact with the formation solution.

During the electro-anodizing process of my invention the electrolyte is forced or circulated through all the pores of anode members by various suitable means, and at a speed high enough to prevent serious overheating of the anodes while being electro-formed. Using this technique of forced electrolyte circulation I can obtain films of higher normal operating voltage capabilities, than by other methods, and with less chance of the formation of the inactive type of film dielectric being encountered.

Figure 2:
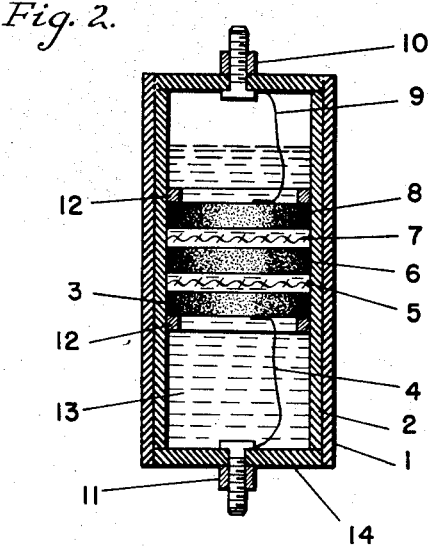

In the drawing made a part of this application Figure 1 is an end view and Figure 2 a cross-sectional view of my new high voltage electrolytic cell condenser. In Figure 2 there is shown at pointing line 1 a container of insulating material and preferably cylindrical by nature, which encompasses the condenser cell. Lining a considerable part of this container as shown at 2 is a resilient tubular member formed of soft rubber or some other suitable material which is resistant to chemical attack by the electrolyte.

Within one closed end of the said container a porous metal cathode electrode is shown at 3 with an electrically conductive lead 4 attached thereto, and leading out through terminal 11 in one end of the cell container. This electrode 3 fits into the resilient liner 2 with sufficient tightness to effect a seal to the electrolyte around the periphery of the said electrode, and the other electrodes mentioned below.

A highly permeable insulating spacer or separator is shown at 5 and directly next to this in position is shown a second porous metal electrode 6 and another spacer 7 which covers one face of electrode 6. An additional porous metal electrode 8, with an electrical lead wire 9 attached to it completes the major part of the simple two series cell shown except for the addition of a suitable electrolyte 13 and a suitable cover to the cell container as shown at 14. Two of the three electrodes, one with a lead wire and one without are of valve metal and constitute the anode and anode-virtual-cathode respectively. A terminal connector 10 is attached to lead wire 9. Retainer rings of non-conducting material are shown at 12.

In order to make the cell just described operative at any voltage above that of any inherent film dielectric on the valve metal parts, an anodic dielectric film should be applied to at least two of the co-operating electrodes of the necessary valve metal. This can best be done before the condenser cell is assembled, and each film should be formed at a voltage of twenty-five to thirty percent above the planned operating voltage of half of the cell, for three electrode type of units, and in suitable proportion where still larger numbers of electrodes are used in series stacks in the cell.

Referring now to the mode of operation of the cell condenser as described in connection with the drawing, it will be desirable that the sparking voltage of the common electrolyte used in the cell shall be at least in excess of one half of the peak operating voltage across the whole stack for a unit having two anodes, and in excess of one third of the voltage applied across the stack which has three anodes.

In further connection with the operating principles of the present invention, if we consider a unit having one unfilmed and one filmed electrode at the extremities of the cell, combined with one intermediate electrode, with an electrolyte common to all, and apply some fixed potential across the cell, in the operable direction, it will be apparent that a potential gradient will exist across the entire electrolyte.

During certain intervals of the charging cycle with a given voltage applied to terminals of the present condenser, the actual voltage distribution of the resulting gradient may change momentarily. At full charge on the condenser, however, division of gradient between electrodes should be about equal.

Further consideration of cell characteristics will clearly emphasize the fact that the voltage drop across either half of the cell cannot exceed the sparking voltage of the electrolyte. Since the actual value of leakage current through the cross-section of the electrolyte that permeates the intermediate electrode will be a very small fraction of the charging current into the condenser, the electrolyte will in effect divide itself electrically into two virtually insulated sections. This effect is augmented by high-frequency charge and discharge cycles. Because also of the valve action of the intermediate electrode it can act both as an anode and cathode depending on the actual direction of current flow in respect to both its co-operating anode and cathode.

Some undesired interaction between sections of the present form of condenser can occur due to long path restricted sections of electrolyte which permeate the pores of the valve metal electrodes that assume an intermediate position and function as both anode and cathode. The losses from this undesired factor vary with electrolyte conductance and electrode configuration.

The efficiency of the present invention as above stated depends on the character of the electrolytes used and the configuration of the electrodes, as well as the modes of operation of the condenser. Electrical leakage between sections must be kept very low, by proper individual design of the unit in respect to the application thereof.

The actual efficiencies realized from my novel structure will vary, as will be apparent to those skilled in the art, as the ratio of the electrical leakages between sections vary in relation to the charging current and frequency of same.

The ideal condenser of the present invention will employ electrodes designed and anodized so as to allow electrical leakage between electrolyte sections of the condenser of only a fraction of a milliampere for condensers of the order of five thousand to ten thousand microfarad volts. This can be accomplished by proper electrode configuration, as for example by incorporating in the condenser electrodes of considerable density having high voltage films to increase the density, or by including a nearly complete dense blocking zone in the intermediate electrode laying parallel to the electrolyte interface of the anode intermediate electrode.

The intermediate anodes of the present invention may also be of very considerable length in respect to their diameter and anodized to voltages high enough to thicken the internal dielectric film thereof to the point where the leakage path thru the anode will become very restricted and of high resistance.

The actual individual design of condensers incorporating the present invention should be such that, in addition to restricting the electrical leakage between electrolyte sections to a low value, enough active surface of anode film is in close, low resistance contact with the electrolyte, to result in low series resistance into the condenser.

As an example of actual results obtained using my newly invented structure I have made cells having electrodes of porous tantalum, made in accordance with my Patent Number 2,395,970, which electrodes weighed one and one-half grams each, and were in the form of porous disks five-eighths of an inch in diameter by one-fortieth of an inch thick, and which when used individually in a non-series single cell as an anode with one associated cathode, with an electrolyte having a sparkling voltage of three hundred and fifty volts, yielded a capacity of eight microfarads at an operating voltage of two hundred and seventy-five. When two of these anodes were used with a single cathode and common electrolyte in accordance with the teachings of the present invention, and with the same electrolyte composition, values of capacity in excess of four microfarads were obtained at an operating voltage of five hundred and fifty.

Using stronger electrolytes than the one just mentioned with the same thin cross-section of intermediate anode leakage current losses between cell sections increase and the safe operating voltage of the unit will be less than the ideal value of charge that would be anticipated as based on the number of sections in the cell.

Having thus described the invention, what I claim as new and desire to protect by United States Letters Patent is:

1. An electrolytic condenser comprising a sealed container, said container having an inner non-corrosive resilient surface, a cathode member having an electrical terminal within one end of said condenser container, an anode having an electrical terminal within the other end of said container, a singular electrolyte filling said container, and an anodized permeable intermediate electrode positioned between said anode and said cathode, said intermediate electrode dividing said container into two closed chambers, said intermediate electrode being porous and comprising restricted passages throughout, said electrolyte extending through said passages forming restricted electro-conductive passages therethrough.

2. An electrolytic condenser as in claim 1 in which the intermediate electrode comprises a ceramic base of pre-determined permeability, metallic coatings thereon, said coatings carrying an anodic dielectric layer, said base, said coatings and said dielectric layer providing restricted electro-conductivity between electrolyte containing chambers.

RICHARD U. CLARK.

REFERENCES CITED

The following references are of record in the file of this patent:

UNITED STATES PATENTS

| Number | Name | Date |
| --- | --- | --- |
| 1,717,488 | Andrews | June 18, 1929 |
| 2,267,717 | Brennan | Dec. 30, 1941 |
| 2,283,723 | Clark | May 19, 1942 |
| 2,290,304 | Waterman | July 21, 1942 |
| 2,359,970 | Clark | Oct. 10, 1944 |